United States Patent [19]

Hutchins et al.

[11] Patent Number: 4,851,477

[45] Date of Patent: Jul. 25, 1989

[54] HYBRID ACRYLIC-CONDENSATION STAR POLYMERS BY GROUP TRANSFER POLYMERIZATION

[75] Inventors: Clyde S. Hutchins, Arlington, Tenn.; Harry J. Spinelli, Wilmington, Del.

[73] Assignee: E. I. Du Pont de Nemours and Company, Wilmington, Del.

[21] Appl. No.: 31,930

[22] Filed: Mar. 30, 1987

Related U.S. Application Data

[63] Continuation-in-part of Ser. No. 901,700, Aug. 29, 1986, abandoned.

[51] Int. Cl.$^4$ ............................ C08J 3/24; C08G 18/04
[52] U.S. Cl. ...................................... 525/123; 525/117; 525/254; 525/132; 525/267; 525/286; 525/288
[58] Field of Search ................ 525/117, 286, 132, 248, 525/254, 267, 123, 288

[56] References Cited

U.S. PATENT DOCUMENTS

| | | | |
|---|---|---|---|
| 3,781,380 | 12/1973 | Labana et al. | 525/286 |
| 4,085,168 | 4/1978 | Milkovich et al. | 525/285 |
| 4,548,963 | 10/1985 | Cluff et al. | 525/117 |
| 4,616,066 | 10/1986 | Tominaga | 525/117 |
| 4,656,226 | 4/1987 | Hutchins et al. | 525/94 |
| 4,659,782 | 4/1987 | Spinelli | 525/293 |
| 4,659,783 | 4/1987 | Spinelli | 525/293 |
| 4,695,607 | 9/1987 | Spinelli | 525/272 |

FOREIGN PATENT DOCUMENTS

| | | | |
|---|---|---|---|
| 2333307 | 1/1974 | Fed. Rep. of Germany | 525/286 |
| 50-115241 | 9/1975 | Japan | 525/286 |

*Primary Examiner*—Wilbert J. Briggs, Sr.
*Attorney, Agent, or Firm*—Charles J. Shoaf

[57] ABSTRACT

Hybrid star polymers with functional acrylic arms made by group transfer polymerization and crosslinked cores made by condensation reactions with the functional groups on the arms.

1 Claim, No Drawings

HYBRID ACRYLIC-CONDENSATION STAR POLYMERS BY GROUP TRANSFER POLYMERIZATION

BACKGROUND

This application concerns star polymers and their preparation with functional acrylic arms made by group transfer polymerization (GTP) and cross-linked cores made by condensation reactions involving the functional groups on the arms.

1. Preparation of Hydrocarbon Star Polymers

Star polymers derived from unsaturated hydrocarbon monomers, such as styrene, butadiene and isoprene, have been obtained by preparing lithium-terminated "living" polymers via anionic polymerization and then coupling the "living" polymer chains by reacting them with various polyfunctional linking agents. This has usually produced hydrocarbon star polymers with relatively few (3-12) arms. Hydrocarbon star polymers with a larger number of arms (e.g., 15-56) have been obtained by sequential anionic polymerization of difunctional monomers (e.g., divinylbenzene) with monofunctional monomers (e.g., styrene) or with monomers that behave as monofunctional monomers (e.g., isoprene). Both methods of preparing hydrocarbon star polymers have been reviewed by B. J. Bauer and L. J. Fetters in *Rubber Chem.* and *Technol.* (Rubber Reviews for 1978), Vol. 51, No. 3, pp. 406-436 (1978).

A. Aoki et al., U.S. Pat. No. 4,304,881 (1981), prepared styrene/butadiene "living" polymers by anionic polymerization and then coupled them by reaction with silicon tetrachloride to produce a 4-arm star polymer having a silicon core in Example 4.

H. T. Verkouw, U.S. Pat. No. 4,185,042 (1980), prepared a polybutadiene "living" polymer by anionic polymerization and then prepared a silicon-containing 3-arm star by reacting the "living" polymer with -glycidoxypropyltrimethoxysilane in Example 5.

R. Milkovich, U.S. Pat. No. 4,417,029 (1983), prepared of hydrocarbon star polymer having 10 arms of 2 kinds. Of the 10 arms, 5 were a diblock copolymer of polystyrene (Mn=12,300) and polyisoprene (Mn=52,450). The other 5 arms were polyisoprene (Mn=52,450). The hydrocarbon star polymer was prepared by charging sec-butyllithium, then styrene, them more sec-butyllithium, then isoprene, then divinylbenzene at a mole ratio of divinylbenzene to sec-butyllithium initiator of 5.5:1. Subsequent reaction of the "living" lithium sites in the core with carbon dioxide or ethylene oxide produced carboxylic acid or hydroxyl groups respectively in the core in Example 2.

T. E. Kovsky, U.S. Pat. No. 4,077,893 (1978), suggested reacting lithium-terminated "living" polymers derived from diene monomers (e.g., butadiene or isoprene) with divinylbenzene to form a 4-25 arm star polymer and then reacting the (still living) star polymer with the same or a different monomer to grow further polymer chains from the core. Thus, star polymers having two kinds of arms were proposed in Col. 5, lines 40-58.

A series of Dow Chemical patents including U.S. Pat. Nos. 4,587,329; 4,599,400; 4,568,737; 4,558,120 and 4,507,466 are directed to hyper-branched non-acrylic stars such as polyamide or polyether condensation polymers with two or more ends per branch. These are discussed in "Dendritic Macromolecules" Synthesis of Starburst Dendrimers" - Tomalia, et al. Macromolecules 19, No. 9,2466-2468 (1986)

W. Burchard and H. Eschway, U.S. Pat. No. 3,975,339 (1976), reacted a mixture of 50% divinylbenzene and 50% ethylvinylbenzene in toluene with n-butyllithium to produce a polydivinylbenzene microgel having 270 active lithium-carbon bonds per molecule. This was subsequently reacted with styrene to produce a star polymer having 270 arms, each arm having a weight average molecular weight of 17,500 in Example 1.

H. Eschway, M. L. Hallensleben and W. Burchard, *Die Makromolekulare Chemie*, Vol. 173, pp. 235-239 (1973), describe the anionic polymerization of divinylbenzene using butyllithium to produce soluble "living" microgels of high molecular weight. There microgels were then used to initiate polymerization of other monomers to produce star polymers. The number of arms depended on the number of active sites in the "living" microgel, which in turn depended on the mole ratio of divinylbenzene to butyllithium initiator. To avoid gellation it was necessary to work at low concentrations (e.g., 2.5% in benzene).

H. Eschway and W. Burchard, *Polymer*, Vol. 16, pp. 180-184 (March, 1975), prepared a star polymer having 67 polystyrene arms and 67 polyisoprene arms by sequential anionic polymerization of styrene, divinylbenzene and isoprene. Low concentrations of monomer were used to avoid gellation.

2. Preparation of Acrylic Star Polymers

In contrast to hydrocarbon star polymers (which may be prepared having different arm sizes, different numbers of arms and even with two different kinds of arms attached to the same core), acrylic star polymers have been available only in a limited variety of structures.

Although not making stars, L. R. Melby in U.S. Pat. No. 4,388,448 (June 14, 1983) does make glycidyl methacrylate polymers at low temperatures by anionic polymerization.

G. W. Andrews and W. H. Sharkey, U.S. Pat. No. 4,351,924 (1982), prepared acrylic star polymers having 3 or 4 hydroxyl-terminated arms by coupling acetal-ended, "living" poly(methyl methacrylate) with 1,3,5-tri(bromomethyl)benzene or 1,2,4,5-tetrabis(bromomethyl)benzene.

O. W. Webster, U.S. Pat. No. 4,417,034 (Nov. 22, 1983) and U.S. Pat. No. 4,508,880 (Apr. 2, 1985), and W. B. Farnham and D. Y. Sogah, U.S. Pat. No. 4,414,372 (Nov. 8, 1983) and U.S. Pat. No. 4,524,196 (June 18, 1985) showed that acrylic star polymers can be prepared via group transfer polymerization by coupling "living" polymer with a capping agent having more than one reactive site or by initiating polymerization with an initiator which can initiate more than one polymer chain. Initiators that could produce acrylic star polymers with up to 4 arms were demonstrated. See Examples 5-7 of U.S. Pat. No. 4,508,880.

I. B. Dicker, et al., U.S. Pat. No. 4,588,795 (May 13, 1986) claims a preferred method of group transfer polymerization using oxyanion catalysts. I. B. Dicker, et al., U.S. Pat. No. 4,622,372 (Nov. 11, 1986) claims an improved process with enhanced catalyst longevity. C. S. Hutchens and A. C. Shor. U.S. Ser. No. 782,257, filed September 30, 1985, now U.S. Pat. No. 4,656,226, granted Apr. 7, 1987, claims acrylic pigment dispersant made by GTP, such as methyl methacrylate-glycidyl methacrylate AB dispersants with functional groups added.

H. J. Spinelli, in applications U.S. Ser. Nos. 771,682; 771,683; 771,684; 771,685; and 771,686, all filed Sept. 3, 1985, teaches the preparation of acrylic star polymers, optionally having functional groups in the cores and/or the arms, with more or less crosslinked cores. Preferably GTP techniques are used with arm-first, core-first, or arm-core-arm sequencing. The following is an update of the status of the above-mentioned applications of Spinelli. Ser. Nos. 771,682 and 771,683 are now respectively U.S. Pat. Nos. 4,659,782 and 4,659,783, granted Apr. 21, 1987; U.S. Ser. No. 771,684 is now U.S. Pat. No. 4,695,607 granted Sept. 22, 1987; U.S. Ser. No. 771,685 was abandoned after refiling as divisional cases Ser. No. 914,714, now U.S. Pat. No. 4,794,144, and Ser. No. 914,715, now U.S. Pat. No. 4,810,756, on Sept. 30, 1986.

The above-cited Webster, Farnharm, et al., Dicker, et al., Hutchens, et al. and Sinelli patents and applications are incorporated herein by reference.

R. J. A. Eckert, U.S. Pat. No. 4,116,917 (1978), describing hydrocarbon star polymers suggested that small amounts of other monomers (e.g., methyl methacrylate) may be included (Col. 3, lines 22-28) and that ethylene dimethacrylate may be used as a coupling agent (Col. 5, lines 22-28). A similar suggestion is made by T. E. Kovsky, U.S. Pat. No. 4,077,893, cited above.

J. G. Zilliox, P. Rempp and J. Parrod, J. Polymer Sci., Part C, Polymer Symposia No. 22, pp. 145-156 (1968), describe the preparation, via anionic polymerization, of a mixture of star polymers having 3 to 26 polymethyl methacrylate arms attached to cores of ethylene glycol dimethacrylate. The mixture also contained linear polymethyl methacrylate. The article says the lengths of the individual branches were constant but that the number of branches per star "fluctuates considerably", giving rise to a very high polydispersity.

3. Uses of Star Polymers

Hydrocarbon star polymers have been used as additives to improve the impact strength of polyphenylene ether resins - W. R. Haaf et al., U.S. Pat. No. 4,373,055 (1983); dry nylon - W. P. Gergen et al. U.S. Pat. No. 4,242,470 (1980); rubber-modified polystyrene - A. Aoki et al, U.S. Pat. No. 4,304,881, cited above; and chlorinated polyvinyl chloride resins M. H. Lehr, U.S. Pat. No. 4,181,644 (1980).

Hydrocarbon star polymers have also been added to asphaltic concrete to improve the service life -C. R. Bresson, U.S. Pat. No. 4,217,259 (1980); to polyetherester resins to provide a desirable overall balance of properties- R. W. Seymoure, U.S. Pat. No. 4,011,286 (1977), and to lubricating oil to improve the viscosity index and act as a dispersant - T. E. Kovsky, U.S. Pat. NO. 4,077,893 (1978).

Hydrocarbon star polymers have also been used to prepare thermoplastics having good clarity by blending them with thermoplastic resins such as methyl methacrylate/styrene/butadiene copolymers, polyester urethanes, epoxides, acrylics, polycarbonates, polyesters, etc.,- E. L. Hillier, U.S. Pat. No. 4,048,254 (1977).

SUMMARY OF THE INVENTION

The invention provides a process for preparing hybrid star polymers which comprise a. a crosslinked core comprising a condensation polymer, and b. attached to the core, at least 5 arms comprising polymer chains derived from one or more monomers polymerizable by a group transfer process; said process comprising c. preparing a block polymer by reacting at least one set selected from (1) a group transfer initiator with one or more monomers having a functional group and a carbon-carbon double bond polymerizable by a group transfer polymerization process, (2) a functional group transfer initiator, and (3) a functional group transfer initiator with one or more of the monomers of (1), and d. contacting the resulting polymer with at least one ingredient selected from a catalyst and one or more other monomers which provide a condensation reaction with the functional groups in the arms.

Preferably, the invention provides a hydrid star polymer prepared by the process wherein the functional group in the arms is an epoxy derived from glycidyl methacrylate.

Preferably, in the arms of star polymers of the invention, the monomers having one carbon-carbon double bond polymerizable by a group transfer polymerization process are selected from and mixtures thereof wherein:

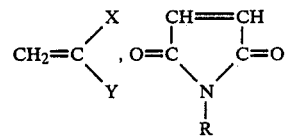

and mixtures thereof wherein:

X is —CN, —CH=CHC(O)X' or —C(O)X';

Y is —H, —CH₃, —CN or —CO₂R, provided, however, when X is —CH=CHC(O)X', Y is —H or —CH₃;

X' is —OSi(R¹)₃, —R, —OR or —NR'R''; each R¹ is independently selected from $C_{1-10}$ alkyl and $C_{6-10}$ aryl or alkaryl;

R is $C_{1-20}$ alkyl, alkenyl, or alkadienyl; $C_{6-20}$ cycloalkyl, aryl, alkaryl or aralkyl; any of said groups containing one or more ether oxygen atoms within aliphatic segments thereof; and any of all the aforesaid groups containing one or more functional substituents that are unreactive under polymerizing conditions; and each of R'and R' is independently selected from $C_{1-4}$ alkyl More preferably, hybrid star polymers of the invention as they are being made comprise a. a core comprising a polymer derived from condensation polymerization of functional groups on arms, with or without other monomers b. attached to the core, at least 5 arms comprising polymer chains derived from one or more monomers polymerizable by an initiator, Q-Z, and c. attached to the core and/or to at least some of the arms the groups Q—Z''—, where the group Q— is the initiating moiety in a "living" group transfer polymerization initiator, Q—Z, and where the group Z''— is derived from an activating substituent, Z, of a group transfer polymerization initiator, Q—Z, and where the initiator, Q—Z, is capable of reacting with a monomer having carbon-carbon double bonds to form a "living" polymer chain having the group, Z''—, attached to one end of the "living" polymer chain and the group, Q—, attached to the other, "living", end of the "living" polymer chain and where, the "living" polymer chain is capable of initiating polymerization of additional monomer, which can be the same or different from the monomer used to prepare the "living" polymer chain, to produce a larger "living"

polymer chain having a group, Z"—, attached to one end of the "living" polymers chain and the group, Q—, attached to the other "living" end of the "living" polymer chain, and where the group, Z"—, is the same as or an isomer of the group, Z—. As is known in group transfer polymerization, upon quenching, such as with water or alcohol, the Q— initiating moiety is removed and the polymer is no longer "living".

Also preferably in the preparation of star polymers of the invention, the "living" group transfer polymerization sites are $(R^1)_3M$— wherein: $R^1$ is selected from $C_{1-10}$ alkyl and $C_{6-10}$ aryl or alkaryl; and M is Si, Sn, or Ge.

Still more preferably, in polymer of the invention, the group, Q—, is $(R^1)_3M$—as defined above.

In such polymers, the group, Z—, is selected from

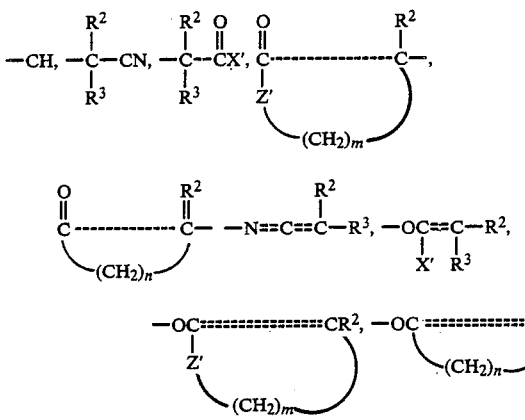

and mixtures thereof wherein:

X' is $OSi(R^1)_3$, —R, —OR or —NR'R"; each $R^1$ is independently selected from $C_{1-10}$ alkyl and $C_{6-10}$ aryl or alkaryl;

R is $C_{1-20}$ alkyl, alkenyl, or alkadienyl; $C_{6-20}$ cycloalkyl, aryl, alkaryl or aralkyl; any of said groups containing one or more ether oxygen atoms within aliphatic segments thereof; and any of all the aforesaid groups containing one or more functional substituents that are unreactive under polymerizing conditions; and each of R' and R" is independently selected from $C_{1-4}$ alkyl each of $R^2$ and $R^3$ is independently selected from H; $C_{1-10}$ alkyl and alkenyl; $C_{6-10}$ aryl, alkaryl, and aralkyl; any of said groups except H containing one or more ether oxygen atoms within aliphatic segments thereof; and any of all the aforesaid groups except H containing one or more functional substituents that are unreactive under polymerizing conditions; and Z' is O or NR';
m is 2, 3 or 4;
n is 3, 4 or 5.

DETAILED DESCRIPTION OF THE INVENTION

To make hybrid star polymers one first prepares acrylic arms by using a functional block copolymer prepared by GTP (e.g., epoxy block copolymers and the wide-variety of other functional blocks that can be derived from them) and then prepare a crosslinked, non-acrylic core by using some type of condensation crosslinking reaction involving the functional segment of the starting GTP block copolymer. The self-stabilized particle which is thus produced has acrylic arms and a condensation core (hence the name "hybrid") as opposed to stabilized particles which have acrylic arms and acrylic cores.

The differences between all-acrylic stars and these hybrid stars involve differences which are primarily associated with the condensation core. The condensation core obtained in the hybrid process is generally more polar than that produced in the all-acrylic process. Thus the swelling of the core or the sensitivity of the core to changes in solvent composition might take on characteristics resembling solvent-responsive dispersants. This aspect could be important in using these solubility difference to control particle size during synthesis and perhaps properties such as refractive index after the particle was made or hardness and softness of the core depending on its crosslink density. The hardness/softness of the core might have a tremendous effect on impact resistance and toughness especially when these hybrid stars are used in various types of acrylic and non-acrylic plastics.

The size, polarity and hardness of the condensation core could probably be fairly well controlled by controlling the size of the starting functional segment together with the amount, type and functionality of the crosslinker which is used. The ability to use a previously isolated and characterized functional block copolymer as the starting material for a hybrid star could be an advantage in that control over the final stabilized particle would not rely on the existence of a "living" non-isolated intermediate (e.g., attached and unattached arms). The sequential nature of the process—production of the functional block copolymer first followed by formation of the stabilized particle—is important, however, it would not be necessary to isolate the starting functional block copolymer in order to prepare a hybrid star, but isolation may sometimes provide an advantage.

The nature and composition of the hybrid arms can be controlled using the same techniques that are used for preparing the non-functional segment of the functional block copolymers or for the preparation of arms for all-acrylic stars.

Known uses of hydrocarbon stars together with the uses of all-acrylic stars would all be appropriate uses for hybrid stars with particular emphasis on the ability to vary the particle size, polarity and energy-absorbing nature (hardness/softness) of the condensation core.

In the preparation of the arms for hybrid star polymers, use is made of group transfer polymerization. By group transfer polymerization, is meant a polymerization process in which polymerization of monomers having carbon-carbon double bonds is initiated by certain initiators of the formula Q-Z where Z is an activating substituent that becomes attached to one end of the growing polymer molecule and where Q is a group that continuously transfers to the other end of the growing polymer molecule as more monomer is added to the growing polymer molecule. Thus, polymerization of the monomer,

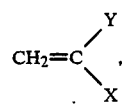

initiated by a group transfer initiator, Q—Z, proceeds as follows:

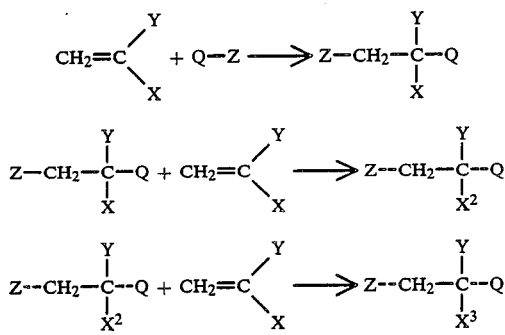

the group, Q, is thus an active site that can initiate further polymerization of more monomer. The polymer "living" polymer molecule. The $(R^1)_3M$ group becomes attached to the other ("living") end of the "living" polymer molecule. The resulting "living+ polymer molecule can then itself act as an initiator for polymerization of the same or a different monomer to produce a new "living" polymer molecule having the Z activating substituent at one end and the $(R^1)_3M$ group at the other ("living") end. The "living" polymer may then be deactivated, if desired, by contacting it with an active proton source such as an alcohol. At this point, it might be useful to consider a specific example - the group transfer polymerization of a specific monomer (in this case, methyl methacrylate) using a specific group transfer initiator (in this case 1-trimethylsiloxy-1-isobutoxy-2-methylpropene). The reaction of 1 mole of initiator with n moles of monomer produces "living" polymer as follows:

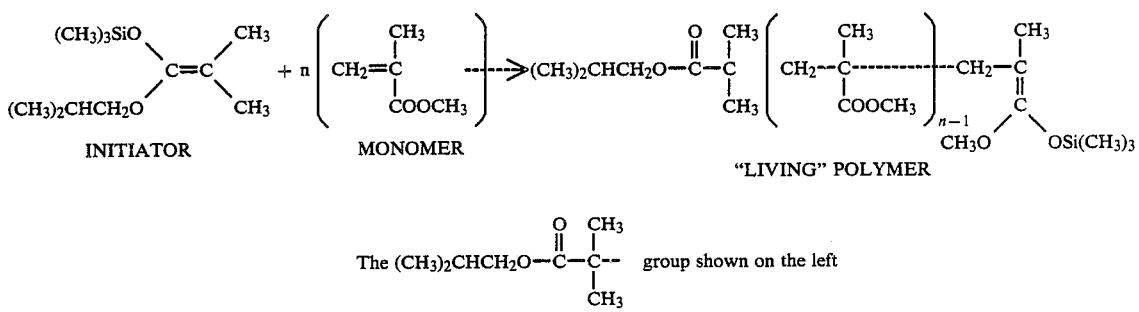

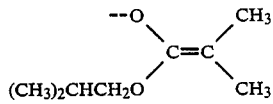

The (CH$_3$)$_2$CHCH$_2$O—C(=O)—C(CH$_3$)— group shown on the left molecule having the group, Q, is referred to as a "living" polymer and the group, Q, is referred to as a "living" group transfer initiating site.

The word "living" is used sometimes herein in quotation marks to indicate its special meaning and to distinguish it from substances which are alive in a biological sense.

More particularly, in the preparation of the star polymers, use is made of the group transfer polymerization process of the general type described in part by W. B. Farnham and D. Y. Sogah, U.S. Pat. No. 4,414,372 and by O. W. Webster, U.S. Pat. No. 4,417,034, and in continuation-in-part U.S. Pat. No. 4,508,880 Webster, granted Apr. 2, 1985, and U.S. Pat. No. 4,524,196 Farnham and Sogah, granted June 18, 1985, the disclosures of all of which are incorporated herein by reference. Group transfer polymerization produces a "living polymer" when an initiator of the formula $(R^1)_3MZ$ is used to initiate polymerization of a monomer having a carbon-carbon double bond.

In the initiator, $(R^1)_3MZ$, the Z group is an activating substituent that becomes attached to one end of the side of the "living" polymer molecule is derived from the activating group, Z, which, in the initiator, was in the form $$\begin{array}{c}-O\\(CH_3)_2CHCH_2O\end{array}C=C\begin{array}{c}CH_3\\CH_3\end{array}$$

The —Si(CH$_3$)$_3$ group on the right side ("living" end) of the "living" polymer molecule is the $(R^1)_3M$ group. The "living" polymer molecule can act as an initiator to initiate polymerization of the same or a different monomer. Thus, if the above "living" polymer is contacted with m moles of butyl methacrylate in the presence of active catalyst, the following "living" polymer is obtained:

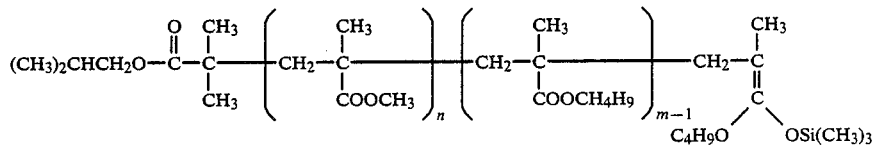

If the resulting "living" polymer is then contacted with methanol, the following deactivated polymer is obtained.

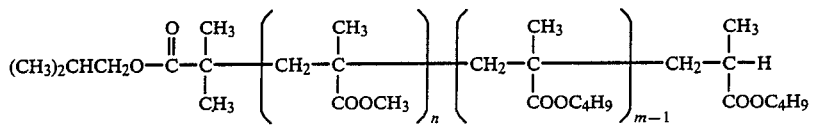

Preferably, group transfer polymerization procedures used in this invention involve a catalyst and an initiator and optionally a polymerization life enhancer. The preferred process involves contacting under polymerization conditions at least one polar monomer with (i) a polymerization initiator compound comprising a tetracoordinate metal selected from Si, Ge and Sn having at least one activating substituent or activating diradical attached thereto and optionally having one or more substituents that are inert under polymerizing conditions, (ii) a catalyst which is a salt comprising an oxyanion whose conjugate acid has a pKa (DMSO) of about 5 to about 24, and a suitable cation, and (iii) a polymerization life enhancement agent which retards the availability of said catalyst during polymerization so as to enhance the duration of "livingness" of the polymerization by increasing the proportion of polymerization events to termination events. Optionally, the catalyst can be a source of fluoride, bifluoride, cyanide, or azide ions or a suitable Lewis acid.

In the preferred method of the invention, a "living" polymer (the arm) is prepared by contacting a monomer having functional groups and a carbon-carbon double bond with a group transfer initiator, $(R^1)_3MZ$. The resulting "living" polymer is then quenched with water or an active hydrogen-containing compound, and then reacted by a condensation reaction of the functional groups in the arms, with or witout other monomers, to form a crosslinked core.

INTRODUCTION TO EXAMPLES

Conceptually, the synthesis of hybrid stars is based upon the prior synthesis of functional block copolymers followed by crosslinking of the functional segment with the appropriate crosslinking agent. Some examples of functional segments and potential crosslinking agents are listed below:

| Functional Segments | Potential Crosslinkers |
|---|---|
| Epoxides* | Diacids e.g., |
| | - oxalic |
| | - adipic |
| | - pthalic |
| | Anhydrides e.g. |
| | - pthalic |
| | - maleic |
| | Diamines e.g., |
| | - hydrazine |
| | - ethylenediamine |
| | - 1,3-diaminopropane |
| | - 1,4-diaminobutane |
| | - 1,6-hexamethylene diamine |
| | - isophorone diamine |
| | Diphenols e.g. |
| | - bisphenol A |
| | Strong proton acids |
| | - para toluene sulfonic acid (pTSA) |
| | - Trifluoro acetic acid |
| | Lewis Acids |
| | - Boron trifluoride etherate |
| | Hindered Amines. e.g., |
| | - diazo bicyclo octane (DABCO) |
| Amines | |

-continued

| Functional Segments | Potential Crosslinkers |
|---|---|
| obtained from epoxy block copolymers by ammoniation | Diepoxides. e.g., - diglycidyl ethers - Epon epoxy resins from Shell Chemical Di/Multi acrylates. e.g.. - Trimethyolpropane triacrylate - ethlyene glycol diacrylate - butane diol diacrylate Di/Multi isocyanates, e.g., - isophrone diisocyanate - Desmodur N from Bayer - 1,6 hexamethylene diisocyanate Melamines Diacids/Anhydride Dialdehydes/diketones |
| Acid and Azirdinyl | |
| - acid functional blocks made from masked acid monomers or from functional initiators | Diepoxide Polyepoxide Polyaziridine |
| - aziridinyl-containing methacrylates | Polyacid |
| Alcohols | |
| - hydroxy terminated acrylic made using functional initiators | Melamines Di/multi isocyanates |
| - hydroxy functional blocks made from epoxy blocks by hydrolysis | Dialdehydes/Diketones Diacids/anhydrides |

*Essentially any crosslinking agent for epoxides will probably work to some extent. In the case of proton- and Lewis acid-promoted crosslinking a non-polar solvent, e.g.. toluene, free of any protonatable or complexing impurities, e.g., glymes, may be necessary.)

Other ingredients and procedures which were used in the examples and in practicing the invention are outlined below to aid in understanding.

I. Starting Materials
 A. Initiators
  Isobutyl Initiator
  1-trimethylsiloxy-1-isobutoxy-2-methylpropene $$(CH_3)_3SiO\diagdown\phantom{C=C}\diagup CH_3$$
$$\phantom{(CH_3)_3SiO}C=C$$
$$(CH_3)_2CHCH_2O\diagup\phantom{C=C}\diagdown CH_3$$

Molecular Weight: 216.39
  OH-Blocked Initiator
  1-(2-trimethylsiloxyethoxy)-1-trimethylsiloxy-2-methylpropene $$(CH_3)_3SiO\diagdown\phantom{C=C}\diagup CH_3$$
$$\phantom{(CH_3)_3SiO}C=C$$
$$(CH_3)_3SiOCH_2CH_2O\diagup\phantom{C=C}\diagdown CH_3$$

Molecular Weight: 276.52
 B. Catalysts
  TASHF$_2$
  Tris(dimethylamino)sulfonium bifluoride

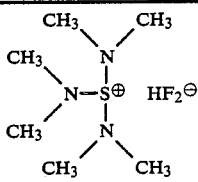

TBAHF2
Tetrabutylammonium bifluoride
$(C_4H_9)_4N^{\oplus}HF_2^{\ominus}$
TBACB
Tetrabuytlammonium chlorobenzoate C. Solvents
Glyme
1,2-dimethoxyethane
$CH_3OCH_2CH_2OCH_3$
Others
Acetonitrile = $CH_3CN$
Xylene THF = Tetrahydrofuran = 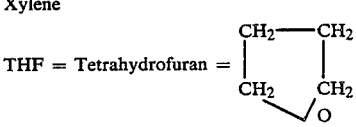

D. Monomers
MMA
methyl methacrylate

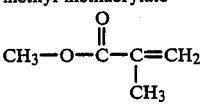

M.W. = 100.12
ZEHMA
2-ethylhexyl methacrylate

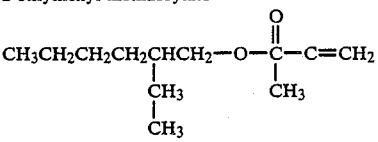

M.W. = 198.29

II. Reactions
A. Polymerization of MMA with "Isobutyl Initiator"

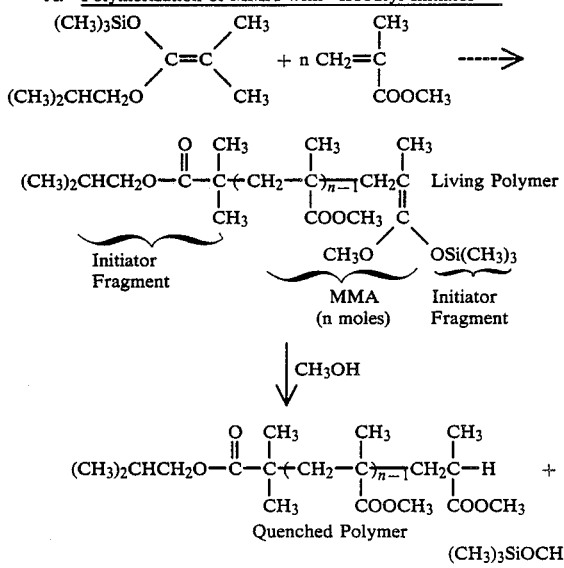

B. Polymerization of MMA with "OH-Blocked Initiator"

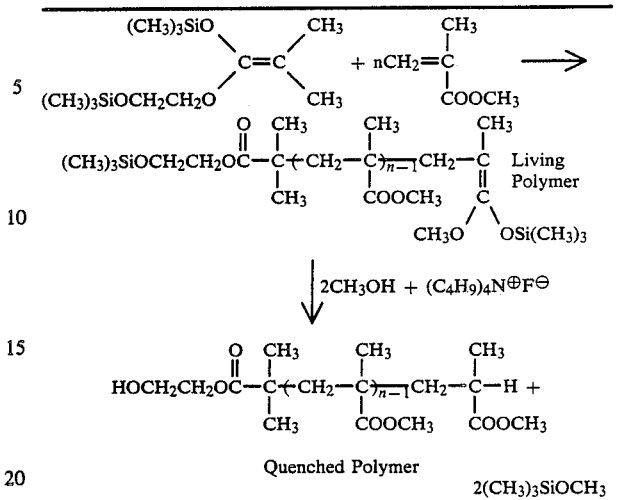

The arms prepared in Examples 1–2, and other similar arms, can be use as the GTP-functional arms for the reactions of Examples 3–5.

In the examples and elsewhere, parts, percentages and proportions are given by weight except where indicated otherwise.

EXAMPLE 1

Preparation of MMA/BMA/GMA ($D_p$-40//$D_p$-4)

All monomers and solvents were dried by passing over 4A molecular sieves. A 250 mL round bottom 4-necked flask equipped with condenser, thermoprobe, $N_2$ inlet, mechanical stirrer and was charge with 44.1 g glyme, 1.68 g of 1-trimethylsiloxy-1-isobutoxy-2-methyl propene, and 66 microliter of a 1M solution of tetrabutyl ammonium m-chlorobenzoate in acetonitrile. A feed containing 33 microliter of 1M tetrabutyl ammonium m-chlorobenzoate in acetonitrile diluted into 0.2 mL of glyme was added over 90 minutes. Concurrently a second feed containing MMA (13.2 g) and n-butyl methacrylate, BMA, (18.8 g) was added over 30 minutes. The temperature rose to 54.4° C. After completion of the 30 minute feed, the batch was cooled to 5° C. and glycidyl methacrylate, GMA, (3.74 g, was added over 2 minutes. The reaction mixture was kept at <10° C. until feed 1 was completed. Xylene (0.1 g) and methanol (1.1 g) were added over 15 minutes. $M_n$=6630, d=1.16 Theoretical $M_n$=5400 solids - 43.8% Epoxy titration=0.32 meq/g solution.

EXAMPLE 2

Preparation of MMA//GMA 87//13 Block Copolymer

A 250 ml four neck roundbottom flask was equipped with septa, thermoprobe and glass paddle stirrer. Flask was then evacuated and dried with heat gun. After filling the flask with nitrogen, glyme (95.5 g) and dimethylketene isobutyl trimethylsilylacetal (2.4 g, 11.1 m moles) were added by syringe. To this mixture a catalyst solution (0.05cc, 1m cesium bifluoride in acetonitrile) was also added by syringe. A catalyst feed (0.22cc, 1m cesium bifluoride in acetonitrile, in 3cc glyme) and an MMA monomer feed (40.0 g, 0.4m) were added simultaneously by syringe pump. During the MMA feed a maximum temperature of 54.2° C. was observed (feed started at 23.9° C.). After completing the MMA feed (45 min) batch was cooled to 2.5° C. with ice bath and 6.0 g (0.42m) of GMA was then added all at once by dropping funnel. Batch temperature increased to 12° C. after GMA addition (exotherm) and then cooled to 6° C. after a few minutes. Catalyst feed solution was maintained for an additional 15 min. (100 min total feed time). Batch was stirred an additional 90 min. with ice bath removed and quenched with 5.0 g of methanol.

Analytic Results

| Residual Monomer: | GMA - less than 1% |
| --- | --- |
| | MMA - less than 1% |
| by high pressure liquid chromatography (HPLC) | |
| GPC mol. wt. | $M_n$ 4770 calculated 4180 |
| | Polydispersity $(M_w/M_n) = 1.3$ |
| Epoxy Dp (by titration) = 3.0 (theoretical = 3.8) | |
| WT. % solids = 49% | |

EXAMPLE 3

Reaction of Epoxy Block Copolymer With Isophorone Diamine

A 250 mL threeneck roundbottom flask was equipped with an addition funnel, thermocouple and a mechnical stirrer. The flask was charged with toluene (25.0 g) and isophorone diamine (1.5 g, 0.019M). The addition funnel was charged with a solution of epoxy block copolymer such as that of Example 1 or 2 in toluene; 48.5% solids - 24.4 g polymer, 0.019M epoxy) and additional toluene (50 g). Over a 30 min interval the epoxy resin solution was added dropwise to the diamine solution. A small temperature rise (from 25° C. to about 29° C.) was observed. After standing for about three hours the originally clear pale-yellow solution was observed to take on a hazy, blueish tinge and a small amount of precipitate was observed.

EXAMPLE 4

Reaction of Epoxy Block Copolymer With 1,6-Hexanediamine

A 250 mL threeneck roundbottom flask was equipped with an addition funnel, thermocouple and a mechanical stirrer. The flask was charged with a solution of an epoxy block copolymer in toluene; 49.5 g of a 47.4% solids solution, 23.5 g polymer, 0.054 M epoxy) and additional toluene (25.0 mL). A solution of 1,6-Hexanediamine (6.3 g, 0.054 M, 2 eq amine) in glyme (25.0 g) was added dropwise from the addition funnel over 30 min. During the addition interval a 2° C. temperature rise was observed. After holding for about 2 hrs the clear solution became pale-yellow in color and a small amount of precipitate was observed.

EXAMPLE 5

Reaction of An Epoxy Block Copolymer With Trifluoroacetic Acid

A 250 mL threeneck roundbottom flask was equipped with an addition funnel, thermocouple and a mechanical stirrer. The flask was charged with a toluene solution of a BMA/GMA epoxy block copolymer (51.3 g), and additional toluene (21.0 g). Trifluoroacetic acid (0.3 g) was added via syringe and the mixture was heated at reflux for about two hours. After cooling, the mixture had a yellow-orange color with a slight haze. The viscosity was higher than at the start of the reaction. There were no gel particles observed. GPC suggested that between 25–30% of the material had a molecular weight (Mn) of about 10,000,000 with a polydispersity index of only 2.2.

An additional experiment involving a toluene solution of a BMA/GMA epoxy block copolymer; 83.5 g) and trifluoroacetic acid (0.5 g) showed a 3° C. temperature rise on addition of the acid and resulted in a hazy solution which had an opalescent blue tinge. An experiment involving an MMA/GMA epoxy block copolymer; 20.0 g of solid polymer in 60.0 g toluene) with trifluoroacetic acid (0.2 g) showed a 1° C. temperature rise, but afforded a clear polymer solution.

EXAMPLE 6

Preparation of Hydroxyl Containing Polymer

A 250 ml flask is charged with toluene, 43.7 gm, TFH, 43.5 gm, 1-trimethylsiloxy-1-methoxy-2-methyl propene, 1.0 gm (0.0057 M), 2-trimethylsiloxyethyl methacrylate, 9.31 gm. The catalyst tetrabutylammonium meta-chlorobenzoate, 0.05 ml of a 1.0 M solution in acetonitrile, is then added and an exotherm results. Feed I, [tetrabutylammonium meta-chorobenzoate, 0.05 ml of a 1.0 M solution in acetonitrile, and THF, 4.4 gm] is started and added over a period of 100 minutes. Feed II [methyl methacrylate, 51.8 gm] is started 40 minutes after the initial shot of catalyst is added to the flask and is then fed in over 40 minutes. At 160 minutes water, 3.9 gm, and isopropanol, 16.3 gm, are added and then heated to reflux for 1 hour. A linear block polymer is formed. Its composition is methyl methacrylate// hydroxyethyl methacrylate 89.6//10.4. Its molecular weight is Mn=17,000, Mw - 26,800.

EXAMPLE 7

Reaction of Hydroxyl Polymer with a Diisocyanate

A 250 mL flask is charged with toluene, 30.0 gm, and polymer of Example 6, 58.61 gm. The flask is heated to reflux and 36.6 gm of solvent are removed. Trimethylhexamethylene diisocyanate, 1.75 gm, dibutyltin dilaurate, 4 drops of a 1% solution in toluene, and toluene, 60.0 gm, are added and heated to reflux for 30 minutes. A hybrid star polymer results. Its molecular weight is Mn=34,400 and Mw=64,100.

Industrial Applicability

In addition to the uses of hybrid star polymers of the invention in coatings for various uses such as solvent responsive dispersants and as tougheners for plastic sheeting and in the other applications indicated above, such hybrid star polymers have many other potential uses, as do other products may be group transfer polymerization. These can include cast, blown, spun or sprayed applications in fiber film, sheet, composite materials, multilayer coatings, photopolymerizable materials, photoresists, surface active agents including soil repellants and physiologically active surfaces, adhesives, adhesion promoters and coupling agents, among others. Uses include as dispersing agents, rheology control additives, heat distortion temperature modifiers, impact modifiers, reinforcing additives, stiffening modifiers and applications which also take advantage of narrow molecular weight and low bimodal polydispersity. End products taking advantage of available characteristics can include lacquers, enamels, electrocoat finishes, high solids finishes, aqueous or solvent based finishes, clear or filled acrylic sheet or castings, including automotive and architectural glazing and illumination housings and refractors, additives for oil and fuel, including antimisting agents, outdoor and indoor graphics including signs and billboartds and traffic control devices, reprographic products, and many others.

What is claimed is:

1. A process for preparing hybrid star polymers which comprises
   a. a crosslinked core comprising a condensation polymer, and
   b. attached to the core, at least 5 arms comprising polymer chains derived from one or more monomers polymerizable by a group transfer process; said process comprising
   c. preparing a block polymer by reacting at least one monomer with group transfer initiator, wherein the monomer(s) have a carbon-carbon double bond, said monomer(s) being polymerizable by a group transfer polymerization process, and either the initiator or at least one monomer, or the initiator and at least one monomer, has at least one functional group which reacts with cross linking ingredients under condensation conditions, said initiator and monomer being selected and reacted under conditions selected from
   the group consisting of:
      1. functional initiator reacted with monomer having no condensation functional group,
      2. functional initiator reacted with functional monomer and then further reacted with monomer having no condensation functional group,
      3. initiator having no condensation functional group reacted first with functional monomer and then reacted further with monomer having no condensation functional group, and
      4. initiator having no condensation functional group reacted first with monomer having no condensation functional group and then reacted further with functional monomer; and
   d. contacting the resulting polymer with at least one ingredient selected from a catalyst and one or more other monomers which provide a cross-linking condensation reaction with the functional groups in the resulting polymer to form said core.

* * * * *